(12) United States Patent
Kyger et al.

(10) Patent No.: US 12,258,519 B2
(45) Date of Patent: *Mar. 25, 2025

(54) PYROLYSER

(71) Applicant: Applied Gaia Corporation, Houston, TX (US)

(72) Inventors: Sheila Macdonald Kyger, Houston, TX (US); Sebastian Burn, Bristol (GB)

(73) Assignee: APPLIED GAIA CORPORATION, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/605,921

(22) Filed: Mar. 15, 2024

(65) Prior Publication Data

US 2025/0066671 A1 Feb. 27, 2025

Related U.S. Application Data

(63) Continuation of application No. 18/237,102, filed on Aug. 23, 2023, now Pat. No. 11,959,023.

(51) Int. Cl.
| | | |
|---|---|---|
| C10B 47/44 | (2006.01) | |
| C10B 53/02 | (2006.01) | |
| C10B 57/02 | (2006.01) | |

(52) U.S. Cl.
CPC ............. *C10B 47/44* (2013.01); *C10B 53/02* (2013.01); *C10B 57/02* (2013.01)

(58) Field of Classification Search
CPC .......... C10B 47/44; C10B 53/02; C10B 57/02
See application file for complete search history.

(56) References Cited

U.S. PATENT DOCUMENTS

| | | |
|---|---|---|
| 4,123,332 A | 10/1978 | Rotter |
| 4,308,103 A | 12/1981 | Rotter |
| 4,412,889 A | 11/1983 | Oeck |
| 5,411,714 A | 5/1995 | Wu et al. |
| 6,619,214 B2 | 9/2003 | Walker |
| 6,758,150 B2 | 7/2004 | Ballantine et al. |
| 8,377,155 B2 | 2/2013 | Tyer |
| 9,052,109 B1 | 6/2015 | Fowler |

(Continued)

OTHER PUBLICATIONS

International Search Report and Written Opinion of International Application No. PCT/US2024/020055, mailed on Apr. 15, 2024, all enclosed pages cited.

*Primary Examiner* — Jonathan Miller
(74) *Attorney, Agent, or Firm* — BURR & FORMAN LLP

(57) ABSTRACT

A pyrolyser including (i) a pyrolysis chamber defining an interior compartment having an upper portion and a lower portion, wherein the pyrolysis chamber includes a feed inlet, a product outlet, an exhaust gas outlet, and an operational length comprising a linear distance from the feed inlet to the product outlet; (ii) a trough located in the lower portion of the interior compartment and extending through the pyrolysis chamber along the operational length of the pyrolysis chamber; and (iii) a material handling system comprising an paddle auger located within the trough and configured to convey biomass from the feed inlet towards the product outlet; wherein the paddle auger comprises an auger shaft, a plurality of sets of paddles directly or indirectly connected to the auger shaft, and a plurality of flights interconnecting the plurality of paddles is provided.

22 Claims, 11 Drawing Sheets

(56) References Cited

U.S. PATENT DOCUMENTS

| | | |
|---|---|---|
| 9,193,916 B2 | 11/2015 | Bar-Ziv et al. |
| 11,242,989 B2 | 2/2022 | Harris et al. |
| 11,959,023 B1 * | 4/2024 | Kyger .................... C10B 57/02 |
| 2002/0195031 A1 | 12/2002 | Walker |
| 2007/0186829 A1 | 8/2007 | Cole et al. |
| 2009/0205252 A1 | 8/2009 | Tyer |
| 2011/0011391 A1 | 1/2011 | Burke |
| 2011/0024280 A1 | 2/2011 | Kostek, Sr. et al. |
| 2012/0125758 A1 | 5/2012 | Hoetzl et al. |
| 2014/0053458 A1 | 2/2014 | Bar-Ziv et al. |
| 2017/0203345 A1 | 7/2017 | Mardikian |
| 2021/0341143 A1 | 11/2021 | Harris et al. |

* cited by examiner

PYROLYSER

TECHNICAL FIELD

Embodiments of the presently-disclosed invention relate generally to a pyrolyser and a pyrolysis method using the same.

BACKGROUND

Biomass materials provide a promising source of primary energy production, but it is largely wasted by inefficient and unsustainable use. To more beneficially realize the latent potential of using biomass materials as an energy source, pyrolysis and gasification technologies have been generally considered. Pyrolysis is promising method that comprises the thermal decomposition for the conversion of biomass into valuable bio-products, such as a solid fraction (biochar), a liquid fraction (bio-oil) and/or a mixture of gases. In this regard, biochar is being promoted, for example, as having the potential to improve soil properties, fertility, and carbon sequestration in soil while also producing renewable energy.

Biochar may be generally characterized as lightweight black residue, made of carbon and ashes, remaining after the pyrolysis of biomass (e.g., the solid material obtained from the thermochemical conversion of biomass in an oxygen-limited environment). Biochar is a stable solid that is rich in pyrogenic carbon and can endure in soil for thousands of years. Accordingly, the use of biochar may be desirable for pyrogenic carbon capture and storage (PyCCS) (e.g., carbon sequestration in the form of biochar).

Accordingly, there remains a need in the art for a more robust and/or efficient pyrolyser and associated pyrolysis method for the conversion of biomass materials into biochar.

SUMMARY OF INVENTION

One or more embodiments of the invention may address one or more of the aforementioned problems. Certain embodiments according to the invention provide a pyrolyser including: (i) a pyrolysis chamber defining an interior compartment having an upper portion and a lower portion, wherein the pyrolysis chamber includes a feed inlet, a product outlet, an exhaust gas outlet, and an operational length comprising a linear distance from the feed inlet to the product outlet; (ii) a trough located in the lower portion of the interior compartment and extending through the pyrolysis chamber along the operational length of the pyrolysis chamber; and (iii) a material handling system comprising an paddle auger located within the trough and configured to convey biomass from the feed inlet towards the product outlet; wherein the paddle auger comprises an auger shaft, a plurality of sets of paddles directly or indirectly connected to the auger shaft, and a plurality of flights interconnecting the plurality of paddles.

In another aspect, the present invention provides a pyrolyser, comprising: (i) a pyrolysis chamber defining an interior compartment having an upper portion and a lower portion, wherein the pyrolysis chamber includes a feed inlet, a product outlet, an exhaust gas outlet, and an operational length comprising a linear distance from the feed inlet to the product outlet; (ii) a trough located in the lower portion of the interior compartment and extending through the pyrolysis chamber along the operational length of the pyrolysis chamber; (iii) a material handling system located within the trough and configured to convey biomass from the feed inlet towards the product outlet; (iv) a primary air source including a plurality of primary air pipes configured to discharge primary air proximately above and across a top portion of the trough; (v) a secondary air source including one or more secondary air pipes configured to discharge secondary air into a rear portion of the pyrolysis chamber; and (vi) a tertiary air source including one or more tertiary air pipes extending along the upper portion of the pyrolysis chamber from a rear portion of the pyrolysis chamber towards a front portion of the pyrolysis chamber; wherein the one or more tertiary air pipes each includes a plurality of tertiary air orifices along a length of each tertiary air pipe.

In another aspect, the present invention provides a pyrolyser, comprising: (i) a pyrolysis chamber defining an interior compartment having an upper portion and a lower portion, wherein the pyrolysis chamber includes a feed inlet, a product outlet, an exhaust gas outlet, and an operational length comprising a linear distance from the feed inlet to the product outlet; (ii) a trough located in the lower portion of the interior compartment and extending through the pyrolysis chamber along the operational length of the pyrolysis chamber; (iii) a material handling system comprising a paddle auger located within the trough and configured to convey biomass from the feed inlet towards the product outlet; wherein the paddle auger comprises an auger shaft, a plurality of sets of paddles directly or indirectly connected to the auger shaft, and a plurality of flights interconnecting the plurality of paddles; (iv) a primary air source including a plurality of primary air pipes configured to discharge primary air proximately above and across a top portion of the trough; (v) a secondary air source including one or more secondary air pipes configured to discharge secondary air into a rear portion of the pyrolysis chamber; and (vi) a tertiary air source including one or more tertiary air pipes extending along the upper portion of the pyrolysis chamber from a rear portion of the pyrolysis chamber towards a front portion of the pyrolysis chamber; wherein the one or more tertiary air pipes each includes a plurality of tertiary air orifices along a length of each tertiary air pipe.

In another aspect, the present invention provides a pyrolysis method comprising the following steps: (i) providing a pyrolyser such as those described and disclosed herein; (ii) feeding a biomass material into the pyrolyser via a feed inlet of the pyrolyser chamber; (iii) conveying the biomass material from the feed inlet towards a product outlet while heating the biomass material to an elevated temperature sufficient to convert the biomass to a biochar product prior to reaching the product outlet.

BRIEF DESCRIPTION OF THE DRAWING(S)

The invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout, and wherein.

Figure 8:
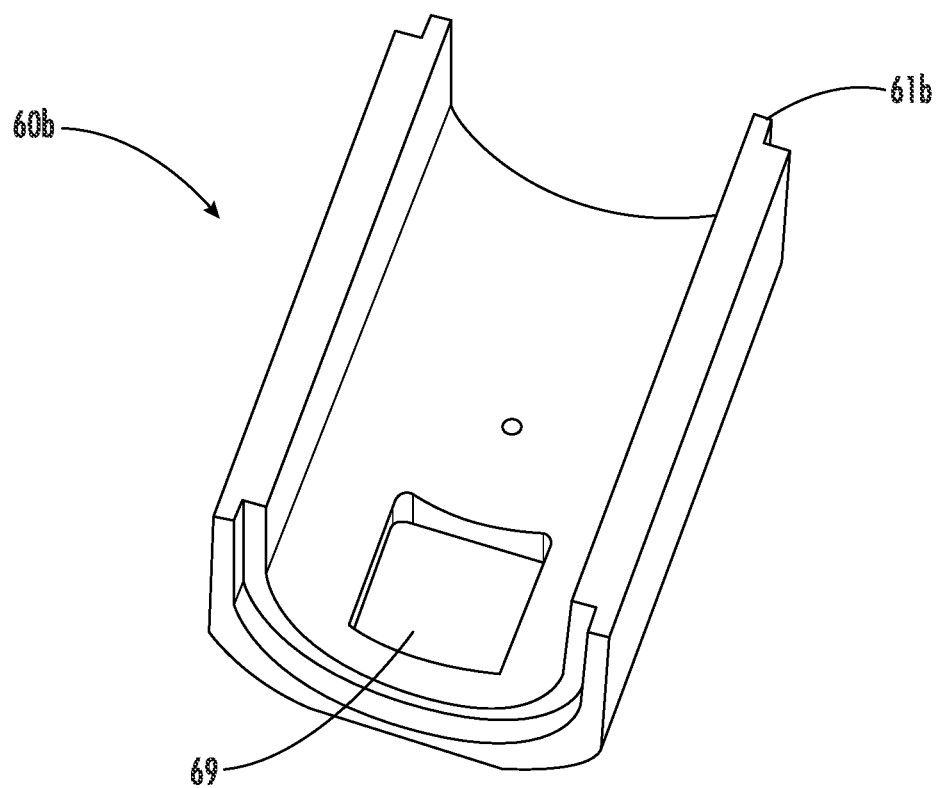
Figure 9:
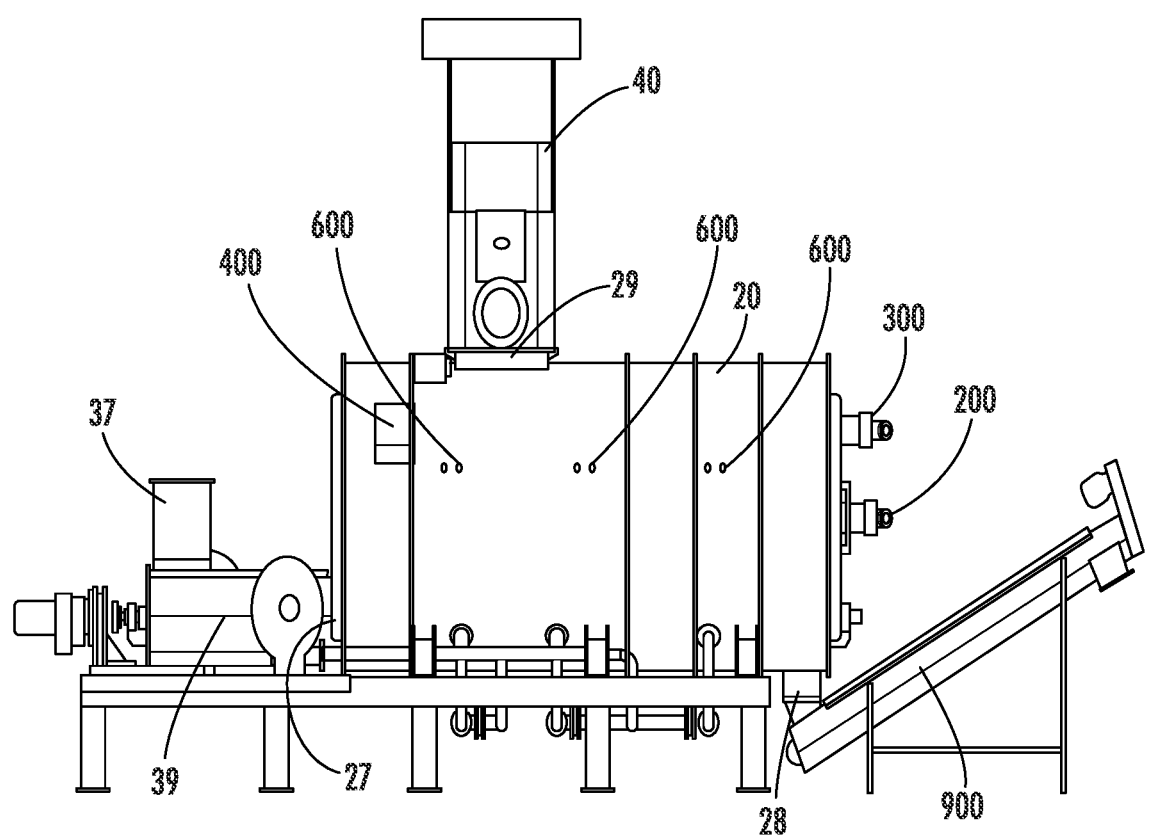

FIG. 8 illustrates a second piece or component of the trough including a trough discharge, in which the second piece or component of the trough may be coupled with additional pieces or components to define the entire trough in accordance with certain embodiments of the invention; and FIG. 9 illustrates a product removal system operatively connected to the product outlet of the pyrolyser in accordance with certain embodiments of the invention.

DETAILED DESCRIPTION

The invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

As used herein, the terms "biomass" and "biomass material" may be used interchangeably throughout the present disclosure. Biomass is renewable organic material that comes from plants and/or animals. Biomass contains stored chemical energy from the sun that is produced by plants through photosynthesis. Non-limiting examples of biomass materials include wood and wood processing waste (e.g., firewood, wood pellets, wood chips, lumber, furniture mill sawdust and waste, and black liquor from pulp and paper mills); agricultural crops and waste materials from, for example, corn, soybeans, sugar cane, switchgrass, woody plants, algae, and crop and food processing residues; biogenic materials in municipal solid waste, such as paper products; cotton and wool products; and food, yard, and wood wastes.

The presently-disclosed invention relates generally to pyrolyser that may process a continuous feed of biomass material, in which the pyrolyser may incorporate a variety of features that provide an improved ability to efficiently convert the biomass material into biochar. Such features, for example, may embody an innovative internal heating system that may include the use multiple air inputs (e.g., primary, secondary, and/or tertiary air as described herein) provided at targeted locations within the pyrolyser at controllable rates, innovated conveyance mechanism that may provide a more uniform heat exposure for the biomass material being processed, the relative positioning of the exhaust gas outlet that may provide a more desirable heat distribution within the pyrolyser, and/or an innovative trough formed from a ceramic material. The innovative internal heating system, in accordance with certain embodiments of the invention may enable the implementation of a zonal control of the pyrolyser and associated pyrolysis method to ensure, in which the zonal control enables an increased efficiency in terms of heat management and/or yield (e.g., weight percentage of biochar produced from incoming biomass material on a dry basis). Additionally or alternatively, one or more water jets may be provided that controllably dispense water at a desired flow rate in a desired zone of the pyrolyser to facilitate temperature control within the pyrolyser. For example, intermittent use of the one or more water jets may prevent overheating within the pyrolyser and/or extinguish any combustion within the pyrolyser. The pyrolyser may generally release, water vapor ($H_2O$), carbon monoxide (CO) and carbon dioxide ($CO_2$), and at times during commissioning hydrogen ($H_2$), methane ($CH_4$) as well as range of other hydrocarbon ($C_xH_y$) gases depending on feedstock and conditions. The pyrolyser may combust the hydrocarbons, noting at times if the hydrocarbons are not combusted, some tars may condense on various components.

In accordance with certain embodiments of the invention, the pyrolyser and associated pyrolysis method may produce, for example, up to 100 kg of biochar per hour. Additionally, the pyrolyser can operate in a wide range of settings and may be transportable by truck, trailer or container. In accordance with certain embodiments of the invention, the pyrolyser may include a burner, such as a burner powered by diesel, oil, gas, liquefied petroleum gas, etc., to provide the initial heat to initiate pyrolysis, once at temperature with syngas being released from the feedstock (e.g., biomass material), the burner may be switched off. In this regard, the pyrolyser may be substantially or completely self-sufficient (e.g., none to limited use of external heat sources such as the burner) in terms of heat generation for the continual pyrolysis of biomass material.

In accordance with certain embodiments of the invention, the heat utilized for continuous conversion of biomass to biochar may be provided via a floating-flame operational configuration within the pyrolyser. For instance, any flame (e.g., combustion) present within the pyrolyser may not be in direct contact with the biomass being conveyed through the trough of the pyrolyser. In this regard, the combustion of off-gasses (e.g., hydrocarbons) from the biomass may occur at regions within the pyrolyser located in, around, or above the open portion of the trough (e.g., the top portion of the trough). For example, the flame within the pyrolyser may reach down inside the trough and around the biomass that is being turned over and conveyed by the paddle auger. The location of the incoming air flow (e.g., primary, secondary, and/or tertiary air) and/or respective air flow rates may establish an oxygen-gradient across the height or z-direction (e.g., perpendicular to the path of the biomass being conveyed through the pyrolyser) of the pyrolyser, in which the oxygen content in the upper regions of the pyrolyser is greater than that present at or proximate to the biomass in the trough (e.g., devoid or substantially devoid of oxygen). Accordingly, combustion within the pyrolyser is effectively maintained above and around (and not in direct contact) the biomass being processed while the heat from the combustion is utilized for the conversion of the biomass into biochar. Additionally or alternatively, the pyrolyser and the associated pyrolysis method may be devoid of indirect heating sources for the biomass via, for example, heating mediums (e.g., hot oil, steam, etc.) that may be conveyed through a component of the pyrolyser (e.g., shaft of the material handling system, trough, etc.). For example, the material handling system and/or the trough may be devoid of any indirect heating mechanisms (e.g., heating channels for the conveyance of a heating medium).

Certain embodiments according to the invention provide a pyrolyser including: (i) a pyrolysis chamber defining an interior compartment having an upper portion and a lower portion, wherein the pyrolysis chamber includes a feed inlet, a product outlet, an exhaust gas outlet, and an operational length comprising a linear distance from the feed inlet to the product outlet; (ii) a trough located in the lower portion of the interior compartment and extending through the pyrolysis chamber along the operational length of the pyrolysis chamber; and (iii) a material handling system comprising an paddle auger located within the trough and configured to convey biomass from the feed inlet towards the product outlet; wherein the paddle auger comprises an auger shaft, a plurality of sets of paddles directly or indirectly connected to the auger shaft, and a plurality of flights interconnecting the plurality of paddles. Additionally or alternatively, certain embodiments according to the invention provide a pyrolyser, comprising: (i) a pyrolysis chamber defining an interior compartment having an upper portion and a lower portion, wherein the pyrolysis chamber includes a feed inlet, a product outlet, an exhaust gas outlet, and an operational length comprising a linear distance from the feed inlet to the product outlet; (ii) a trough located in the lower portion of the interior compartment and extending through the pyrolysis chamber along the operational length of the pyrolysis chamber; (iii) a material handling system located within the trough and configured to convey biomass from the feed inlet towards the product outlet; (iv) a primary air source including a plurality of primary air pipes configured to discharge primary air proximately above and across a top portion of the trough; (v) a secondary air source including one or more secondary air pipes configured to discharge secondary air into a rear portion of the pyrolysis chamber; and (vi) a tertiary air source including one or more tertiary air pipes extending along the upper portion of the pyrolysis chamber from a rear portion of the pyrolysis chamber towards a front portion of the pyrolysis chamber; wherein the one or more tertiary air pipes each includes a plurality of tertiary air orifices along a length of each tertiary air pipe. In accordance with certain embodiments of the invention, the present invention provides a pyrolyser, comprising: (i) a pyrolysis chamber defining an interior compartment having an upper portion and a lower portion, wherein the pyrolysis chamber includes a feed inlet, a product outlet, an exhaust gas outlet, and an operational length comprising a linear distance from the feed inlet to the product outlet; (ii) a trough located in the lower portion of the interior compartment and extending through the pyrolysis chamber along the operational length of the pyrolysis chamber; (iii) a material handling system comprising a paddle auger located within the trough and configured to convey biomass from the feed inlet towards the product outlet; wherein the paddle auger comprises an auger shaft, a plurality of sets of paddles directly or indirectly connected to the auger shaft, and a plurality of flights interconnecting the plurality of paddles; (iv) a primary air source including a plurality of primary air pipes configured to discharge primary air proximately above and across a top portion of the trough; (v) a secondary air source including one or more secondary air pipes configured to discharge secondary air into a rear portion of the pyrolysis chamber; and (vi) a tertiary air source including one or more tertiary air pipes extending along the upper portion of the pyrolysis chamber from a rear portion of the pyrolysis chamber towards a front portion of the pyrolysis chamber; wherein the one or more tertiary air pipes each includes a plurality of tertiary air orifices along a length of each tertiary air pipe As noted above, the material handling system may be configured to provide a more uniform of consistent exposure of the biomass to the heat within the pyrolyser as the biomass is conveyed through the pyrolyser. In accordance with certain embodiments of the invention, the plurality of sets of paddles may be located along an auger length of the paddle auger, in which the plurality of sets of paddles may each include a plurality of individual paddles located around a circumference of the auger shaft in a spaced-apart configuration at a respective position along the auger length. For example, the spaced-apart configuration may comprise the plurality of individual paddles being located equidistant (±10%) from each other around the circumference of the auger shaft.

In accordance with certain embodiments of the invention, the plurality of individual paddles include at least a portion thereof having (i) a radial arm having a first end connected to the auger shaft and a second end, and (ii) a cross arm connected to the second end of the radial arm. By way of example, a paddle ratio between a cross arm-length to a radial arm-length may range from about 0.5:1 to about 2:1, such as at least about any of the following: 0.5:1, 0.6:1, 0.8:1, and 1:1, and/or at most about any of the following: 2:1, 1.8:1, 1.6:1, 1.5:1, 1.4:1, 1.2:1, and 1:1. Additionally or alternatively, the second end of the radial arm may be connected to the cross arm at an intersecting location located at a midpoint of the cross arm-length or within ±25%, 10%, or 5% of the cross arm-length from the midpoint. In accordance with certain embodiments of the invention, the radial arm, the cross arm, or both may comprise an angled configuration including two planar portions and/or arcuate portions connected via a bent portion or joining portion between the two planar portions and/or arcuate portions. In this regard, an angle defined between the two planar portions and/or arcuate portions may comprise from about 45° to about 135°, such as at least about any of the following: 45°, 60°, 75°, and 90°, and/or at most about any of the following: 135°, 120°, 105°, and 90°.

In accordance with certain embodiments of the invention, the plurality of flights interconnecting the plurality of paddles may include a plurality of inner flights and a plurality of outer flights. In this regard, the plurality of inner flights may interconnect respective radial arms of a first set of paddles to respective second radial arms of a second set of paddles, and the plurality of outer flights may interconnect respective cross arms of the first set of paddles to respective third cross arms of a third set of paddles, in which the first set of paddles is located between and adjacent to the second set of paddles and the third set of paddles along the auger length. In accordance with certain embodiments of the invention, each individual panel may be interconnected with at least one other individual panel. By way of example, the plurality of inner flights and the plurality of outer flights may be provided in an alternating manner along the auger length. In accordance with certain embodiments of the invention, the plurality of inner flights, the plurality of outer flights, or both may comprise an arcuate configuration.

The paddle auger, in accordance with certain embodiments of the invention, may have a paddle set-density comprising a number of the plurality of sets of paddles per auger length comprises from about 2 to about 15 sets of paddles per meter of auger length, such as at least about any of the following: 2, 3, 4, 5, and 6 sets of paddles per meter of auger length, and/or at most about any of the following: 15, 12, 10, 8, and 6 sets of paddles per meter of auger length. Additionally or alternatively, the plurality of sets of paddles may comprise a first set of paddles and an adjacent second set of paddles, wherein the plurality of individual paddles of the second set of paddles are offset along the circumference of the auger shaft by about 10% to about 90%, such as at least about any of the following: 10, 20, 30, 40, 45, and 50%, and/or at most about any of the following: 90, 80, 70, 60, and 50%. By way of example, each adjacent set of paddles may be offset from each other along the circumference of the auger shaft by about 10% to about 90%, such as at least about any of the following: 10, 20, 30, 40, and 50%, and/or at most about any of the following: 90, 80, 70, 60, and 50%.

The material handling system, in accordance with certain embodiments of the invention, may further comprises a screw auger portion coupled to the paddle auger. In this regard, the screw auger portion may be generally devoid of paddles and/or flights and may be located between the paddle auger and the product outlet. The screw auger portion, for example, is not intended to provide the level or degree of uniform heat exposure as the paddle auger since the biomass should be converted to biochar by reaching the screw auger portion. As such, the screw auger portion is configured to convey the biochar towards an adjustable outlet weir plate. For example, the screw auger portion may be configured to convey a product (e.g., biochar) over and/or under the adjustable outlet weir plate allowing the product (e.g., biochar) to exit the pyrolysis chamber via the product outlet.

As noted above, the pyrolyser includes an exhaust gas outlet, which may be located at a top portion of the pyrolysis chamber and is operatively coupled to a chimney. The chimney, for example, may include one or more adjustable dampeners therein. The damper(s) may be selectively moved between intermediate positions between a closed and open state to control the rate of exhaust gas in real-time. By way of example, the adjustment of the damper(s) may be adjusted to ensure complete or more complete combustion of the off-gasses (e.g., hydrocarbons) released from the biomass during pyrolysis. For example, opening of the damper(s) may also let out more heat whilst closing the damper(s) (as long as still open enough to let the exhaust gases out) traps in more heat. In this regard, the relative positioning of the damper(s) between a closed state and an open state (e.g., 100% open) may be adjusted to facilitate control of the heat present in the pyrolysis chamber.

In accordance with certain embodiments of the invention, the pyrolysis chamber comprises (i) a first zone including the feed inlet and comprising from about 10 to about 40% of the operational length of the pyrolysis chamber, (ii) a second zone including an imaginary center line dividing the pyrolysis chamber into a front half including the first zone and a back half, in which the second zone comprises from about 10 to about 40% of the operational length of the pyrolysis chamber, and (iii) a third zone including the product outlet and being located in the back half of the pyrolysis chamber, in which the third zone comprises from about 10 to about 40% of the operational length of the pyrolysis chamber. The first zone may be located adjacent a first end of the pyrolysis chamber, while the third zone may be located adjacent a second end of the pyrolysis chamber, and the second zone is located adjacent and in between the first zone and the third zone. In accordance with certain embodiments of the invention, a center point of the exhaust gas outlet is located within the first zone or the second zone. For example, the center point of the exhaust gas outlet may be located at the center line or in the front half of the pyrolysis chamber. In accordance with certain embodiments of the invention, the center point of the exhaust gas outlet is located from the product inlet by about 20 to about 50% of the operational length of the pyrolysis chamber, such as at least about any of the following: 20, 22, 24, 25, 26, 28, 30, and 32% of the operation length of the pyrolysis chamber, and/or at most about any of the following: 50, 48, 46, 45, 44, 42, 40, 38, 36, 35, 34, 33, and 32% of the operational length of the pyrolysis chamber. The relative positioning of the exhaust gas outlet, for instance, facilitates or pulls heat from the rear portion (e.g., closest to the product outlet) towards the front portion (e.g., closest to the feed inlet), which facilitates the efficient use of heat generated within the pyrolyser in the conversion of biomass to biochar.

As noted above, the pyrolyser includes a trough located in the lower portion of the interior compartment and extending through the pyrolysis chamber along the operational length of the pyrolysis chamber. The trough, for example, may comprise a generally U-shaped configuration. In accordance with certain embodiments of the invention, the trough comprises a length measured along the operational length of the pyrolysis chamber and an internal width (e.g., widest internal dimension) perpendicular to the length. The trough may have a trough-ratio of the internal width to the height from about 0.5:1 to about 3:1, such as at least about any of the following: 0.5:1, 0.7:1, 0.8:1, 1:1, 1.2:1, and 1.5:1, and/or at most about any of the following: 3:1, 2.8:1, 2.5:1, 2.2:1, 2:1, 1.8:1, and 1.5:1. In accordance with certain embodiments of the invention, the trough may include a discharge port formed in the bottom of the trough and in operative communication with the product outlet of the pyrolysis chamber. Additionally or alternatively, the trough may comprise a unitary single piece or a plurality of sub-components directly or indirectly coupled together to define the trough. In accordance with certain embodiments of the invention, the trough comprises a cast ceramic material. The cast ceramic material may comprise a refractory material having a degradation temperature above about 1200° C., such as above about 2000° C.

In accordance with certain embodiments of the invention, the pyrolyser also includes a pair of opposing apron sections having corresponding upwardly pacing surfaces that extend from corresponding side walls of the pyrolysis chamber and terminate adjacent or proximate to a top portion of the trough. The upwardly facing surfaces, for example, may comprise heat resistant bricks or cast high temperature ceramic material. By way of example, the heat resistant bricks may include notched portions on an underneath surface, and retaining bars may be disposed within the notched portions thereby securing the heat resistant bricks in place. In accordance with certain embodiments of the invention, a high temperature cement may be used to join the heat resistant bricks together. Additionally or alternatively, the pair of opposing apron sections may include one or more expansion joints defining separate portions of the upwardly facing surfaces. By way of example only, the expansion joints may comprise fiber blankets.

The pyrolyser may comprise a primary air source including a plurality of primary air pipes configured to discharge primary air proximately above and across a top portion of the trough (e.g., the open portion of the top of the trough). The plurality of primary air pipes may comprise a first plurality of primary air pipes configured to discharge primary air over the top portion of the trough from a first side, and a second plurality of primary air pipes configured to discharge primary air over the top portion of the trough from an opposing second side. In accordance with certain embodiments of the invention, the first plurality of primary air pipes, the second plurality of primary air pipes, or both are positioned in a spaced-apart configuration along the operation length (e.g., along the length of the trough). Additionally or alternatively, the first plurality of primary air pipes, the second plurality of primary air pipes, or both (e.g., independent from each other) may comprise a primary air pipe-density comprising the number of primary air pipes per operational length of the pyrolysis chamber from about 1 to about 4 primary air pipes per meter of operation length of the pyrolysis chamber, such as at least about any of the following: 1, 1.5, 2, and 2.5 primary air pipes per meter of operation length of the pyrolysis chamber, and/or at most about any of the following: 4, 3.5, 3, and 2.5 primary air pipes per meter of operation length of the pyrolysis chamber. By way of example only, each of the first plurality of primary air pipes and the second plurality of primary air pipes have the same air pipe-density along the entire length of the trough.

In accordance with certain embodiments of the invention, the first plurality of primary air pipes, the second plurality of primary air pipes, or both protrude from the respective apron portions. The first plurality of primary air pipes, the second plurality of primary air pipes, or both may extend at least partially over the trough, terminate in-line with a proximate inner edge of the trough, or short of a proximate inner edge of the trough. In this regard, for example, the primary air is discharged at locations proximate and above the top of the trough. In accordance with certain embodiments of the invention, the first plurality of primary air pipes, the second plurality of primary air pipes, or both may discharge primary air from about 150 mm to about 250 mm above an uppermost portion of the trough, such as at least about any of the following: 150, 160, 180, 195, and 200 mm, and/or at most about any of the following: 250, 240, 230, 220, 210, and 200 mm.

In accordance with certain embodiments of the invention, the first plurality of primary air pipes and the second plurality of primary air pipes may be positioned relative to each other to define a plurality of corresponding pairs of primary air pipes that are aligned with each other across the trough. Additionally or alternatively, the plurality of corresponding pairs of primary air pipes include a first group of corresponding pairs of primary air pipes defining a first zone, a second group corresponding pairs of primary air pipes defining a second zone, and third group of corresponding pairs of primary air pipes defining a third zone. In this regard, a first volume of primary air may be selectively discharged from the first zone, a second volume of primary air may be selectively discharged from the second zone, and a third volume of air may be selectively discharged from the third zone are independently adjustable from each other. For example, an operator and/or programmable logic controller (PLC) may adjust the respective amount of primary air that is discharged within each of the zones. Such zonal control of the primary air, for instance, may facilitate achievement or maintaining a desired temperature profile within the pyrolyser. As discussed herein, for example, an operator and/or PLC may independently adjust the primary air volume in each zone, a secondary air volume (e.g., discussed below), and a tertiary air volume (e.g., discussed below) to provide operational control of the temperature profile and/or oxygen-content profile within the pyrolyser, in which the respective air volumes provide localized regions of oxygen-containing air that is or may facilitate combustion of off-gasses (e.g., hydrocarbons) from the biomass as the desired locations or regions within the pyrolyser.

In accordance with certain embodiments of the invention, the first zone includes from about 10 to about 40% of the operational length of the pyrolysis chamber extending from the feed inlet, the third zone includes from about 10 to about 40% of the operational length of the pyrolysis chamber extending from the product outlet, and the second zone comprises from about 10 to about 40% of the operational length of the pyrolysis chamber and is located adjacent and between the first zone and the third zone. In accordance with certain embodiments of the invention, the first zone, the second zone, and the third zone have the same number of primary air pipes. Alternatively, the first zone may have more primary air pipes than the second zone and/or the third zone. Alternatively, the second zone may have more primary air pipes than the first zone and/or the third zone. Alternatively, the third zone may have more primary air pipes than the first zone and/or the second zone.

As noted above, the pyrolyser may include a secondary air source including one or more secondary air pipes configured to discharge secondary air into a rear portion of the pyrolysis chamber. In accordance with certain embodiments of the invention, the one or more secondary air pipes may be configured to discharge secondary air into an intermediate portion in a z-direction of the pyrolyser that is above the plurality of primary air pipes (e.g., and below tertiary air pipe(s)). By way of example, the pyrolysis chamber has a total height in the z-direction from a bottommost portion to a topmost portion, and the intermediate portion is located from about 25 to 80% of the total height measured from the bottommost portion of the pyrolysis chamber, such as at least about any of the following: 25, 30, 35, 40, 45, and 50% of the total height measured from the bottommost portion of the pyrolysis chamber, and/or at most about any of the following: 80, 75, 70, 65, 60, 55, and 50% of the total height measured from the bottommost portion of the pyrolysis chamber. In accordance with certain embodiments of the invention, the one or more secondary air pipes are located to discharge secondary air at a midpoint (±10%) in the z-direction of the pyrolyser chamber. Additionally or alternatively, an average vertical distance (e.g., in the z-direction) between the secondary air pipe(s) (e.g., the point of discharge) to the primary air pipes (e.g., point of discharge) accounts for about 3 to about 30% of the total height of the pyrolyser chamber in the z-direction, such as at least about any of the following: 3, 5, 6, 8, 10, 12, and 15% of the total height of the pyrolyser chamber in the z-direction, and/or at most about any of the following: 30, 28, 25, 22, 20, 18, and 15% of the total height of the pyrolyser chamber in the z-direction. Additionally or alternatively, the one or more secondary air pipes may terminate at a location within the third zone, as noted above. In this regard, the secondary air pipes provide secondary air within the rear portion the pyrolyser near the product outlet. In accordance with certain embodiments of the invention, the one or more secondary air pipes may terminate at an intermediate location (e.g., along the operational length) between an end of the paddle auger and the product outlet.

As noted above, the one or more secondary air pipes are configured to discharge secondary air at a volume independent from the plurality of primary air pipes. In this regard, the adjustment of the primary air volume (e.g., independently in each zone) and the secondary air volume discharged from the one or more secondary air pipes provides enhanced control of the temperature and oxygen profiles within the pyrolyser chamber by, for example, providing localized introduction of oxygen-containing air for localized initiation or localized increase in combustion within desired regions or locations within the pyrolyser chamber.

The pyrolyser may also comprise a tertiary air source including one or more tertiary air pipes extending along the upper portion of the pyrolysis chamber from a rear portion of the pyrolysis chamber towards a front portion of the pyrolysis chamber, in which the one or more tertiary air pipes each includes a plurality of tertiary air orifices along a length of each tertiary air pipe. In accordance with certain embodiments of the invention, the one or more tertiary air pipes may be located above the one or more secondary air pipes in a z-direction. For example, each of the one or more tertiary air pipes includes a first end proximate to the rearmost end of the pyrolysis chamber and a second end distal from the rearmost end of the pyrolysis chamber, in which the tertiary air pipes run generally along the top of the pyrolyser chamber. A heat shield or shields, in accordance with certain embodiments of the invention, may be located above the tertiary air pipes (e.g., between the tertiary air pipes and the top of the pyrolyser chamber) to provide some resistance to gasses from flowing directly to the exhaust gas outlet and/or chimney. In this regard, the combusted gases at or proximate the tertiary air pipes may not simply immediately escape the pyrolyser chamber, but instead resides within the pyrolyser chamber for a given time such that the heat therefrom may more efficiently be utilized during the pyrolysis method.

In accordance with certain embodiments of the invention, the one or more tertiary air pipes may each have a length from about 25 to 100% of the operational length, such as at least about any of the following: 25, 30, 35, 40, 45, 50, 55, and 60% of the operational length, and/or at most about any of the following: 100, 98, 96, 95, 94, 92, 90, 88, 85, 82, 80, 75, 70, 65 and 60% of the operational length. In this regard, the one or more tertiary air pipes may extend from the rear or rear portion of the pyrolyser chamber and extend forwardly towards the front of the pyrolyser chamber. In accordance with certain embodiments of the invention, the one or more tertiary air pipes may terminate at or prior to reaching the exhaust gas outlet.

In accordance with certain embodiments of the invention, the plurality of tertiary air orifices may comprise an orifice density comprising a number of tertiary air orifices per length of the respective tertiary air pipes from about 2 to about 10 tertiary air orifices per meter of the respective tertiary air pipes, such as at least about any of the following: 2, 2.5, 3, 3.5, 4, 4.5, and 5 tertiary air orifices per meter, and/or at most about any of the following: 10, 9, 8, 7.5, 7, 6.5, 6, 5.5, and 5 tertiary air orifices per meter. Additionally or alternatively, the plurality of tertiary air orifices of the one or more tertiary air pipes have a variable diameter along a length thereof, including a first tertiary air orifice proximate the rearmost end of the pyrolysis chamber, a second tertiary air orifice proximate a frontmost portion of the pyrolysis chamber, and a third tertiary air orifice located between the first and second tertiary air orifices, in which the first tertiary air orifice is larger than the third tertiary air orifice, and the third tertiary air orifice is larger than the second tertiary air orifice. Additionally or alternatively, the tertiary air orifices of each tertiary air pipe may include sets of individual tertiary air orifices along the length of the respective tertiary air pipe. For example, each set of individual tertiary air orifices may include at least a first individual tertiary air orifice and a second tertiary air orifice, in which the first and second individual tertiary air orifices are offset from each other about a circumference of the respective tertiary air pipe from about 45 to about 135°, such as at least about any of the following: 45, 50, 55, 60, 70, 80, and 90°, and/or at most about any of the following: 135, 120, 110, 100, and 90°. Additionally or alternatively, the plurality of tertiary air orifices are configured to discharge tertiary air generally downward towards the lower portion of the pyrolysis chamber.

The pyrolyser, in accordance with certain embodiments of the invention, may include a burner unit operatively connected to the interior compartment of the pyrolyser chamber, in which the burner unit is configured to provide heat into the interior compartment. The burner unit, for example, may run on gasoline, diesel fuel, or gas (e.g., natural gas). The burner unit, for instance, may be utilized during an initial heat-up phase to bring the interior compartment of the pyrolyser chamber to a desired elevated temperature prior to the initial introduction of biomass into the pyrolyser chamber. As noted above, once the pyrolysis method reaches steady state the use of the burner unit may mostly, if not completely, be not needed and shutdown.

In accordance with certain embodiments of the invention, the pyrolyser may include a water source comprising a plurality of water jets penetrating the upper portion of the pyrolysis chamber. The plurality of water jets may be configured to discharge water into the upper portion of the pyrolysis chamber, and/or a one or more rear water jets penetrating a rear wall of the pyrolysis chamber, and being configured to discharge water into a rear portion of the pyrolysis chamber. The plurality of water jets may be individually controlled to provide a localized discharge of water at a desired flow rate based, for example, on localized temperatures present within the pyrolyser chamber. In accordance with certain embodiments of the invention, each of the zones (as discussed above) may include one or more pairs or water jets therein for selectively providing a desired water flow to that particular zone, such as for temperature control within the zone of interest.

Figure 1A:
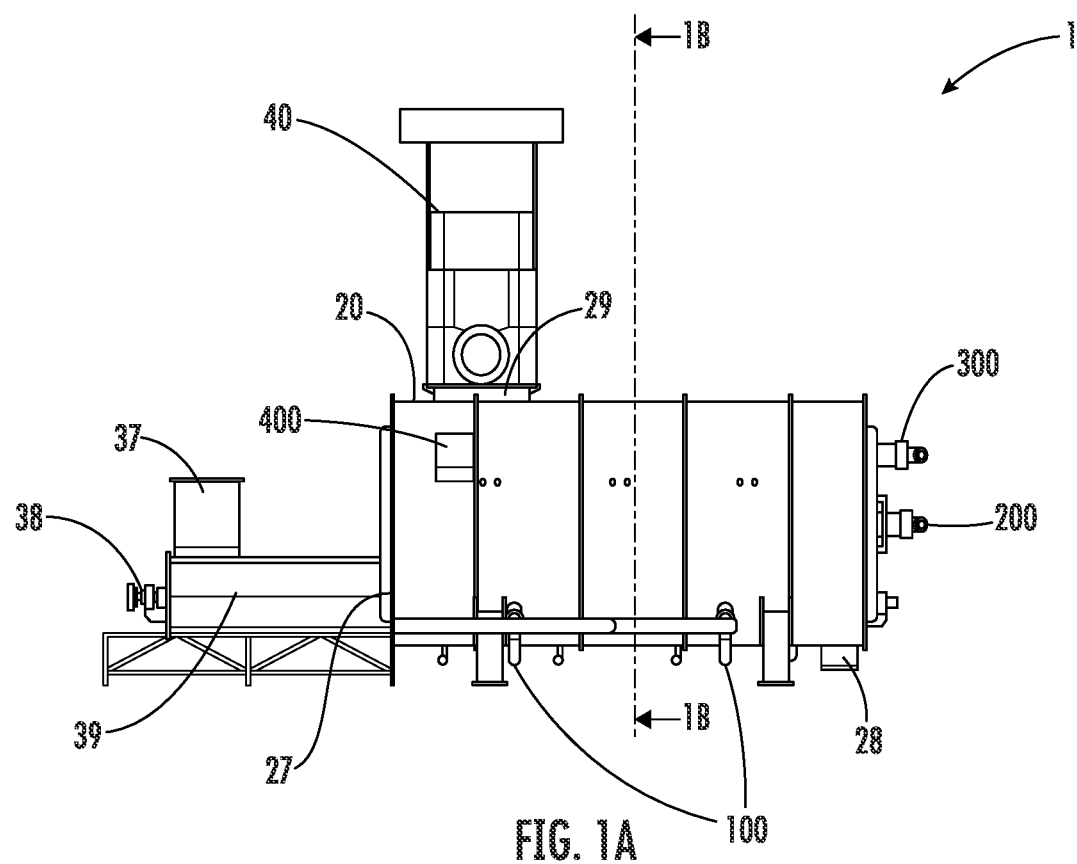
FIG. 1A illustrates a schematic of a pyrolyser in accordance with certain embodiments of the invention.
Figure 1B:
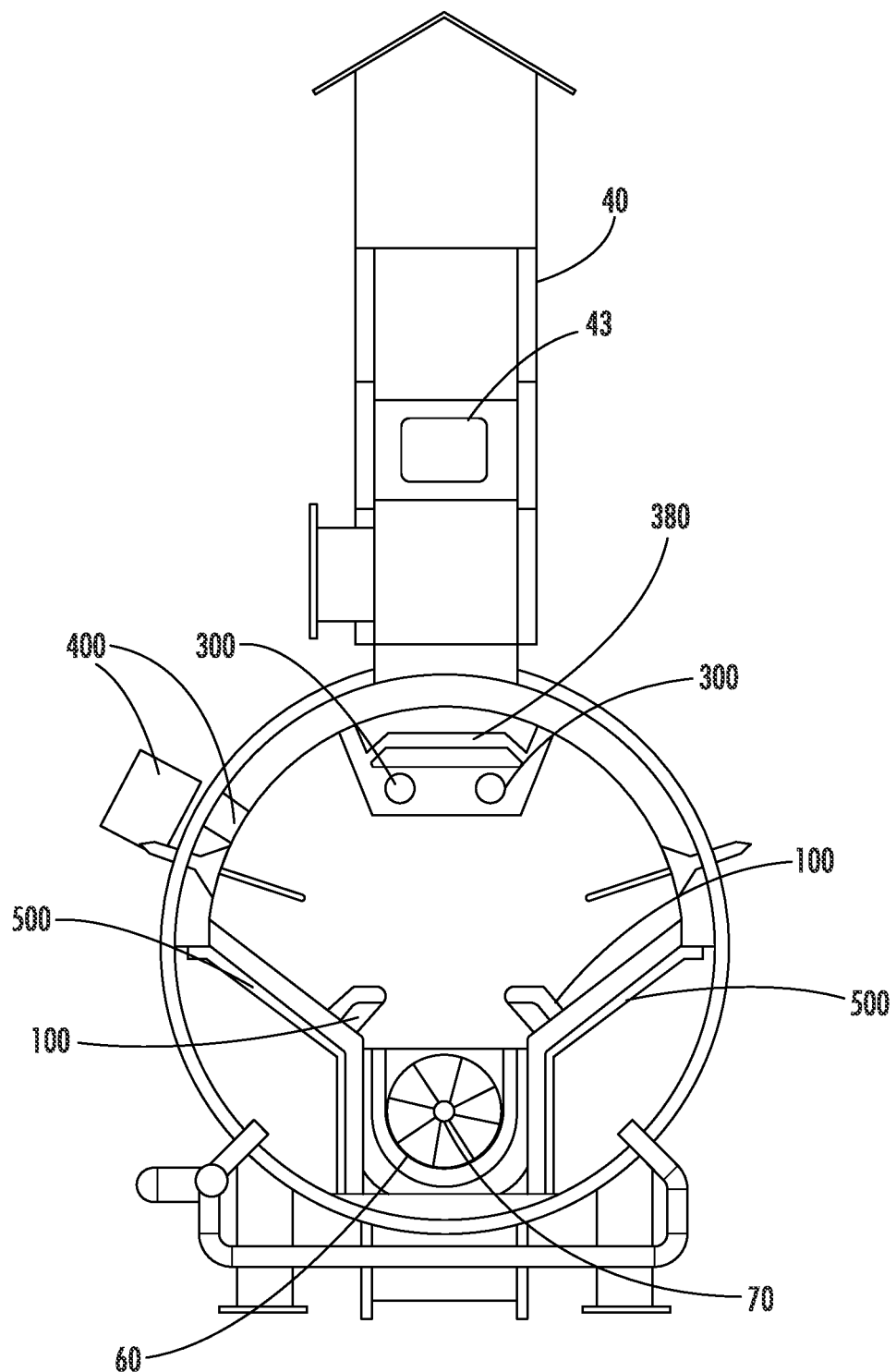
FIG. 1B is a cross-sectional view of illustrating the internal components of the front portion of the pyrolyser of FIG. 1A.
Figure 1C:
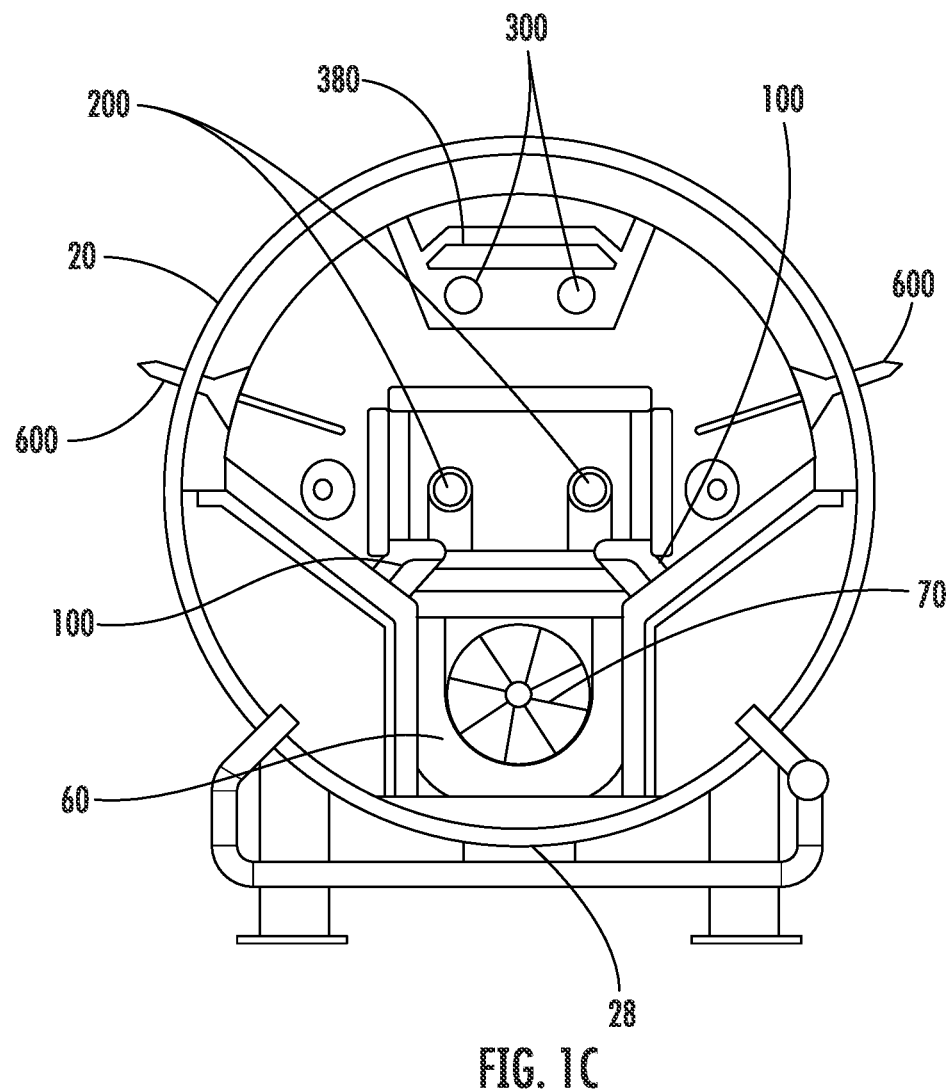
FIG. 1C is a is a cross-sectional view of illustrating the internal components of the rear portion of the pyrolyser of FIG. 1A.
Figure 2:
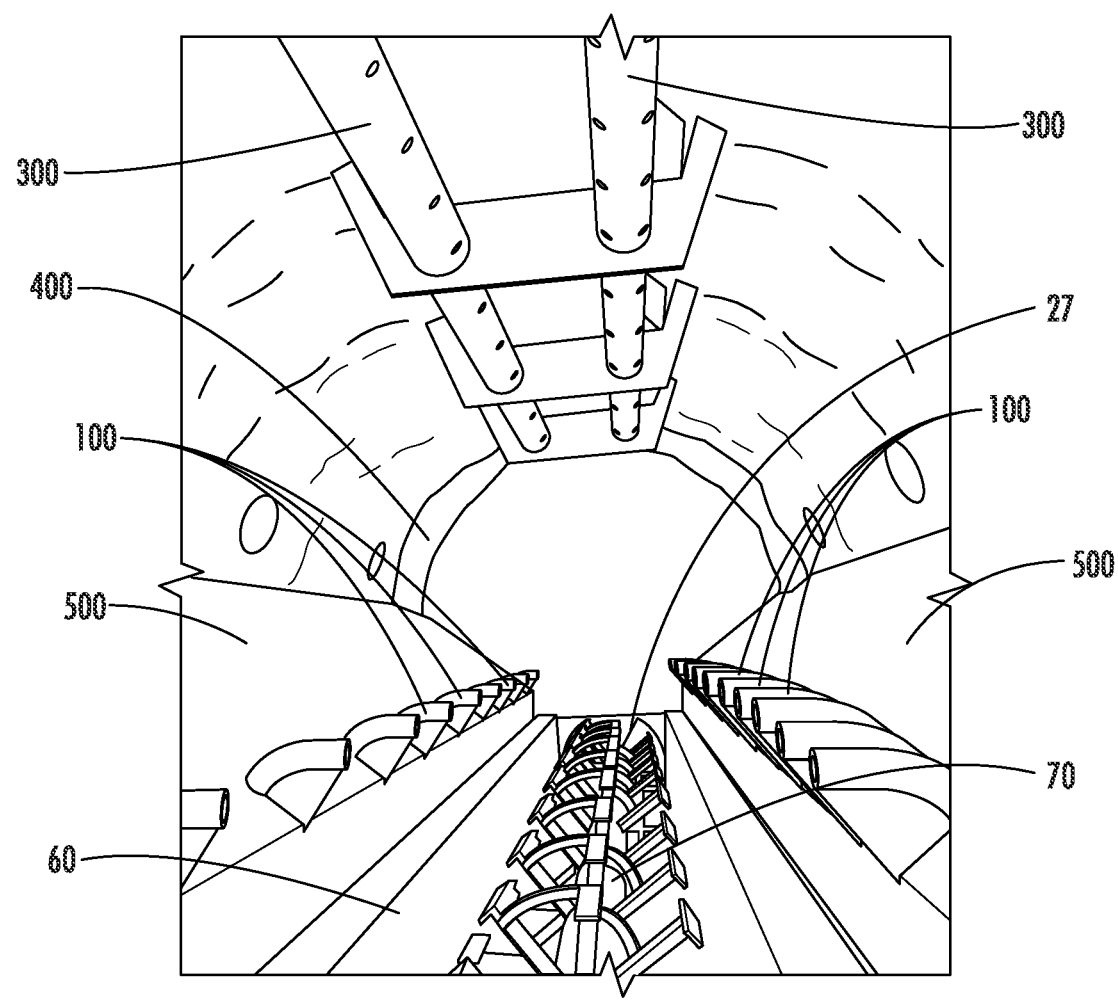
FIG. 2 shows the interior compartment of the pyrolysis chamber from the rear portion towards the front portion.

FIGS. 1-9, as noted above, generally provide illustrations of example embodiments. In this regard, FIGS. 1A-1C illustrates a pyrolyser 1 having a pyrolysis chamber 20 defining an interior compartment having an upper portion and a lower portion, in which the pyrolysis chamber includes a feed inlet 27, a product outlet 28, an exhaust gas outlet 29, and an operational length comprising a linear distance from the feed inlet to the product outlet. FIG. 1A also illustrates a chimney 40 operatively coupled to the exhaust gas outlet 29. FIG. 1A also illustrates primary air pipes (e.g., header pipes leading to the plurality of primary air pipes) 100, secondary air pipes 200 entering the pyrolysis chamber at the rear portion thereof, and tertiary air pipes 300 entering the pyrolysis chamber at the rear portion thereof. FIG. 1A also illustrates the presence of a feed hopper 37, in which biomass for conversion may be unloaded, that supply's a feed trough 39 having a feed auger 38 traveling through. In this regard, the biomass may be controllably released or metered into the feed trough and conveyed into the pyrolysis chamber via the feed auger. In accordance with certain embodiments of the invention, the feed auger may be coupled to the paddle auger. FIG. 1B is a cross-sectional view of illustrating the internal components of the front portion of the pyrolyser of FIG. 1A. FIG. 1B illustrates the location of the trough 60 and the paddle auger 70 located therein. FIG. 1B also illustrates the relative positioning within the pyrolysis chamber 20 of the primary air pipes 100, the tertiary air pipes 300, and the corresponding apron portions 500. As shown in FIG. 1B, a heat shield 380 may be disposed over at least a portion to the tertiary air pipes 300, such as to prevent immediate escape of gases via the pyrolysis chamber outlet 29. In this regard, the chimney 40 may include one or more dampers 43 to control the outlet of exhaust gases. FIG. 1C is a cross-sectional view of illustrating the internal components of the rear portion of the pyrolyser of FIG. 1A. FIG. 1C shows the relative location of the secondary air pipes 200 to the primary air pipes 100 and tertiary air pipes. FIG. 1C also illustrates the presence of water jets 600 configured to selectively discharge water into desired locations of the pyrolysis chamber. FIG. 2 shows the interior compartment of the pyrolysis chamber from the rear portion towards the front portion. For instance, FIG. 2 shows the relative positioning of the primary air pipes 100 to the trough 60, as well as the extension of the tertiary air pipes 300, which include a plurality of orifices running along the length thereof for discharge tertiary air. As may be appreciated, FIG. 2 illustrates the side walls of the pyrolysis chamber being covered with fire blankets.

Figure 3:
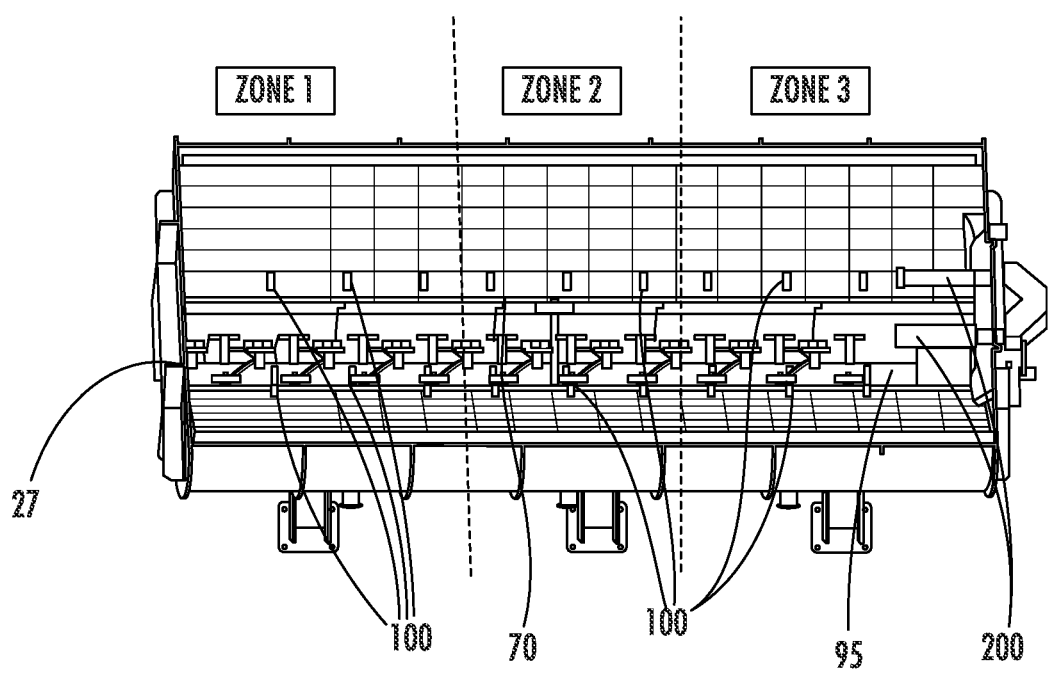
FIG. 3 illustrates a schematic of the internal components of a pyrolyser and illustrates, inter alia, a material handling system disposed within a trough and the controllable zones (e.g., having the same number of primary air pipes in each) in accordance with certain embodiments of the invention.

FIG. 3 illustrates a schematic of the internal components of a pyrolyser 1 and illustrates, inter alia, a material handling system disposed within a trough and the controllable zones (e.g., having the same number of primary air pipes in each) in accordance with certain embodiments of the invention. FIG. 3, for instance, illustrates that that the material handling system may include the paddle auger 70 that may be coupled to a screw auger portion 95, wherein the screw auger portion is located between the paddle auger and the product outlet. FIG. 3 also illustrates a spaced-apart positioning along the operational length of the plurality of primary air pipes 100. In this regard, the respective zones (e.g., first, second, and third zones) may be defined by the number of primary air pipes within each zone. As shown in FIG. 3, for instance, each zone includes the same number of primary air pipes therein.

Figure 4:
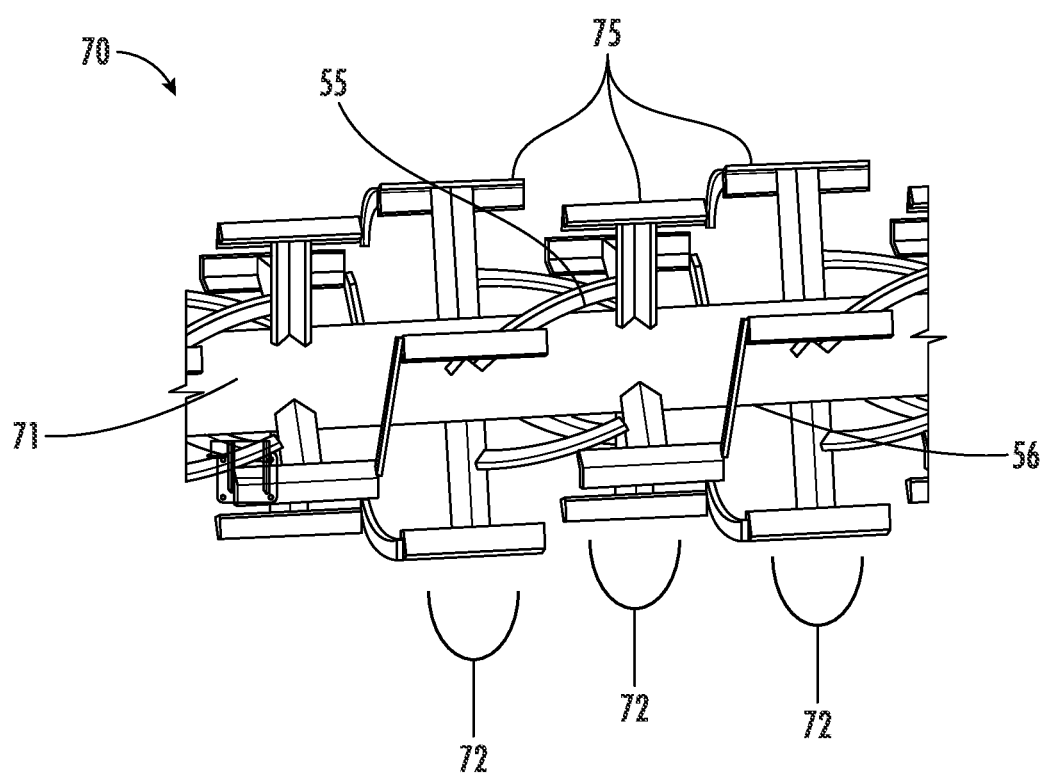
FIG. 4 illustrates a paddle auger in accordance with certain embodiments of the invention.
Figure 5:
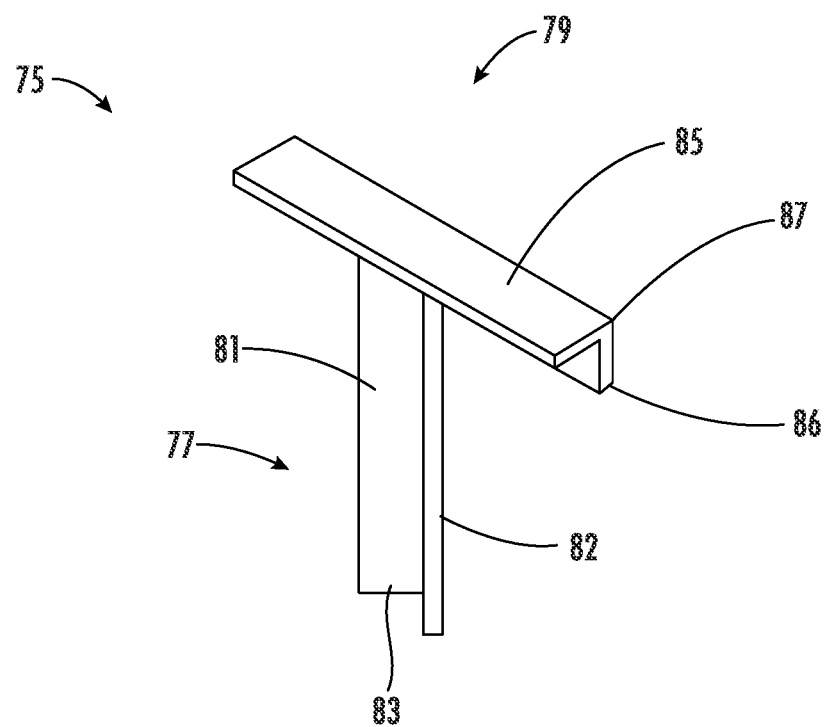
FIG. 5 illustrates an individual paddle of the paddle auger of FIG. 4.

As noted above, the material handling system may comprise a paddle auger that is located within the trough and configured to convey biomass from the feed inlet towards the product outlet. FIG. 4, for example, illustrates a paddle auger 70 having an auger shaft 71, a plurality of sets of paddles 72 (e.g., including a plurality of individual paddles 75) directly or indirectly connected to the auger shaft. The paddle auger 70 also includes a plurality of flights 55, 56 interconnecting the plurality of paddles. As shown in FIG. 4, the plurality of flights may include a plurality of internal flights 55 and a plurality of external flights 56. FIG. 5 illustrates an individual paddle 75 of the paddle auger of FIG. 4. The individual paddle 75 includes a radial arm 77 having a first end connected to the auger shaft and a second end, and a cross arm 79 connected to the second end of the radial arm. The radial arm 77 includes two planar portions 81, 82 connected via a bent portion 83. Similarly, the cross arm 79 includes two planar portions 85, 86 connected via a bent portion 86.

Figure 6:
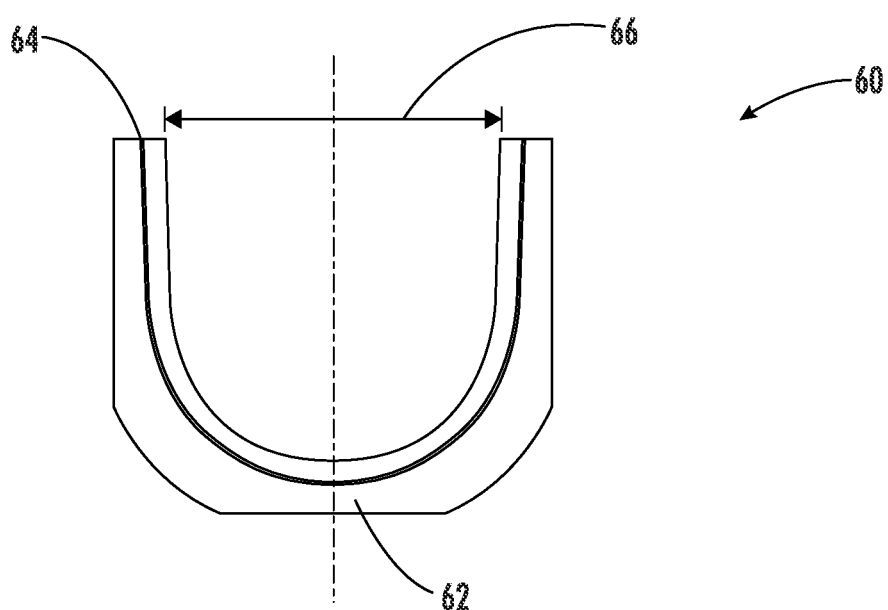
FIG. 6 illustrates a view of the trough in which the material handling system may be located to convey biomass through a length of the trough in accordance with certain embodiments of the invention.
Figure 7:
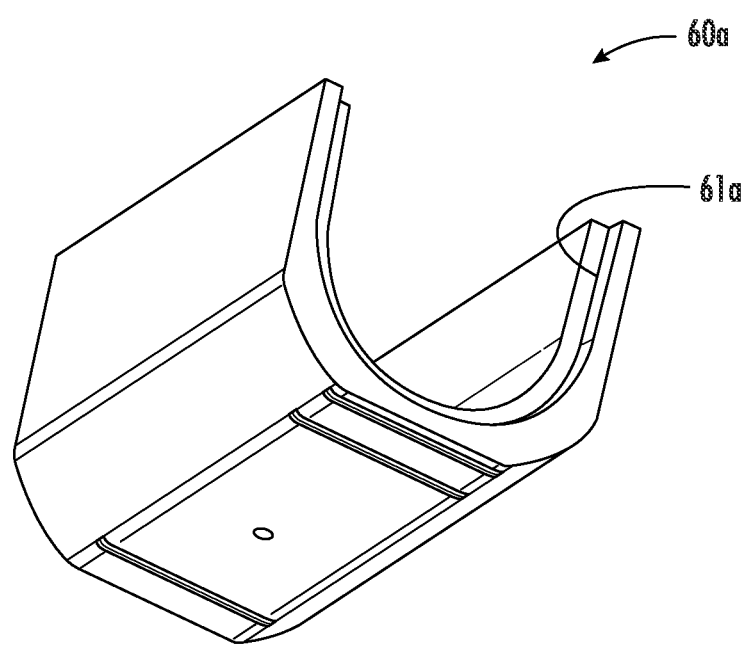
FIG. 7 illustrates a first piece or component of the trough that may be coupled with additional pieces or components to define the entire trough in accordance with certain embodiments of the invention.

FIG. 6 illustrates a view of the trough 60 in which the material handling system may be located to convey biomass through a length of the trough in accordance with certain embodiments of the invention. The trough has a generally U-shaped configuration with a bottom portion 62 and a top portion 64. That the top portion 64, the trough 60 includes an internal width 66, which may in some instances define the widest internal portion of the trough. FIG. 7 illustrates a first piece or component 60a of the trough that may be coupled with additional pieces or components to define the entire trough in accordance with certain embodiments of the invention. The first piece or component 60a, for instance, may include a female and/or male connecting portion 61a that can be interlocked with a corresponding male or female portion of a second piece or component. FIG. 8, for example, illustrates a second piece or component 60b of the trough including a trough discharge 69, in which the second piece or component of the trough may be coupled with additional pieces or components to define the entire trough in accordance with certain embodiments of the invention. The second piece or component 60b may include a male and/or female connecting portion 62a that can be interlocked with a corresponding male or female portion 61a of a first piece or component 60a. In this regard, a plurality of individual trough pieces or components may be interlocked together as desired. Each individual trough piece or component may be separately or individually directly or indirectly coupled or secured to the pyrolysis chamber in addition to being interlocked together.

FIG. 9 illustrates a product removal system 900 operatively connected to the product outlet 28 of the pyrolyser in accordance with certain embodiments of the invention. In this regard, biochar may be discharged from the pyrolysis chamber 20 into a product trough having a product auger therein, in which the biochar can be conveyed to a desired storage location.

In another aspect, the present invention provides a pyrolysis method comprising the following steps: (i) providing a pyrolyser such as those described and disclosed herein; (ii) feeding a biomass material into the pyrolyser via a feed inlet of the pyrolyser chamber; (iii) conveying the biomass material from the feed inlet towards a product outlet while heating the biomass material to an elevated temperature sufficient to convert the biomass to a biochar product prior to reaching the product outlet.

In accordance with certain embodiments of the invention, the method may comprise pre-processing the biomass material, such as by drying the biomass material to a moisture content from about 1 to about 30% by weight, such as at least about any of the following: 1, 3, 5, 6, 8, 10, 12, and 15% by weight, and/or at most about any of the following: 30, 28, 26, 25, 24, 22, 20, 18, and 15% by weight. Additionally or alternatively, the pre-processing of the biomass may also comprise reducing an average size of the biomass material to an average diameter below about 40 mm, such as at least about any of the following: 5, 6, 8, 10, 12, 15, 18, and 20 mm, and/or at most about any of the following: 40, 35, 30, 25, and 20 mm.

The biomass material may comprise a variety of materials from organic sources, such as plants and trees while generally not including metals, stones, plastics, rubbers and/or glass. By way of example only, approximately 300 kg of virgin (untreated) biomass per hour may be converted into high carbon content biochar with a yield rate of around, for example, 30%, depending on biomass feedstock. The resulting biochar may be of particularly high-quality, and can be used, for example, in the soil or as animal feed. A few non-limiting examples of biomass materials suitable for processing includes woodchips, crop husks, pellets, nut shells, poultry litter and wood shavings. Particularly preferred biomass (e.g., high conversion rate to biochar) for processing generally has a high carbon content. Biomass, for example, is made up of cellulose, hemicellulose and lignin, only here carbon can be found. Cellulose and hemicellulose evaporate almost completely at temperatures above 500° C., while up to 50% of the lignin also volatilizes. The volatile components of biomass consist mainly of different hydrocarbon compounds. When these are released during the pyrolysis process according to certain embodiments of the invention, they are mixed with air and combusted to provide the heat to continue the pyrolysis process, avoiding the need for external fuel sources to be relied upon. As noted throughout, for instance, the pyrolyser and associated pyrolysis method can operate at temperatures exceeding 650° C., meaning the pyrolyser and associated pyrolysis method can be optimized to produce the best biochar with from a given feedstock (e.g., biomass material).

The feedstock (e.g., biomass material for conversion to biochar) may be delivered to the pyrolyser via the feed hopper. When operating, the feed hopper may preferably always be partially full of feedstock to avoid air being drawn into the pyrolyser chamber via the hopper (e.g., the feedstock acts as a plug to prevent ingress of external air through the feed inlet). In this regard, the step of feeding a biomass material comprises excluding external air from entering the feed inlet. Feedstock can be delivered to and/or into the pyrolyser chamber by auger, conveyor, manually or other systems. For example, the step of feeding the biomass material into the pyrolyser chamber may comprise metering, such as via a rotary valve between the hopper outlet and the feed auger) the biomass material into a feed auger from a hopper, in which a level of the biomass material is maintained in the hopper to prevent the ingress of external air via the feed inlet. The feed auger, for example, may be coupled to the paddle auger.

In accordance with certain embodiments of the invention, the pyrolyser includes the primary air source as noted above, the secondary air source as noted above, and the tertiary air source as noted above. In accordance with certain embodiments of the invention, a first temperature of the first zone is maintained, such as during steady state operation, from about 550 to about 750° C., such as at least about any of the following: 550, 580, and 600° C., and/or at most about any of the following: 750, 725, 700, 680, 660, 650, 620, and 600° C. Additionally or alternatively, a second temperature of the second zone is maintained, such as during steady state operation, from about 650 to about 900° C., such as at least about any of the following: 650, 680, 700, 720, 740, 750, 760, and 780° C., and/or at most about any of the following: 900, 880, 850, 840, 820, 800, 790, and 780° C. Additionally or alternatively, a third temperature of the third zone is maintained, such as during steady state operation, from about 800 to about 1000° C., such as at least about any of the following: 800, 820, 850, 880, and 900° C., and/or at most about any of the following: 1000, 980, 960, 950, 940, 930, 920, 910, and 900° C.

In accordance with certain embodiments of the invention, an average primary air volume (e.g., total primary air volume discharged from all primary air pipes) during, for example, steady-state operation comprises from about 0 to about 300 m$^3$/hr, such as at least about any of the following: 0, 20, 50, 80, 100, 120, 150, and 180 m$^3$/hr, and/or at most about any of the following: 300, 280, 250, 220, 200, and 180 m$^3$/hr. Additionally or alternatively, an average secondary air volume (e.g., total secondary air volume discharged from all secondary air pipes), for example, during steady-state operation comprises from about 300 to about 600 m$^3$/hr, such as at least about any of the following: 300, 220, 350, 380, and 400 m$^3$/hr, and/or at most about any of the following: 600, 580, 550, 520, 500, 480, 450, 420, and 400 m$^3$/hr. Additionally or alternatively, an average tertiary air volume (e.g., total tertiary air volume discharged from all tertiary air pipes), for example, during steady-state operation comprises from about 800 to about 1200 m$^3$/hr, such as at least about any of the following: 800, 850, 900, 950, and 1000 m$^3$/hr, and/or at most about any of the following: 1200, 1150, 1100, 1050, and 1000 m$^3$/hr.

In accordance with certain embodiments of the invention, the operation of maintaining the first temperature, the second temperature, and the third temperature may comprise adjusting the relative air volume from the primary (e.g., independently in respective zones), secondary, and/or tertiary air. Additionally or alternatively, the operation of maintaining the first temperature, the second temperature, and the third temperature may also comprise, at least in part, discharging water from the water source via the plurality of water jets as noted above. In this regard, each respective zone in the pyrolysis chamber may be monitored relative to a desired temperature and if the actual/measured temperature in the zone of interest exceeds the desired temperature for that zone, the water jet(s) located within that zone may discharge water locally therein to reduce the local temperature in that zone.

In accordance with certain embodiments of the invention, the pyrolysis method may comprise a heat-up phase, as noted above, prior to feeding the biomass material into the pyrolyser, in which the heat-up phase comprises supplying heat to the interior compartment of the pyrolysis chamber via the burner unit. Additionally, the pyrolysis method may comprise an initial feedstock delivery phase, in which an average initial feedstock delivery-primary air volume (e.g., total primary air volume discharged from all primary air pipes) during the initial feedstock delivery phase comprises from about 400 to about 700 m$^3$/hr, such as at least about any of the following: 400, 420, 450, 480, 500, 520, and 550 m$^3$/hr, and/or at most about any of the following: 700, 680, 650, 620, 600, 580, and 550 m$^3$/hr. Additionally or alternatively, the pyrolysis method may comprise an average initial feedstock delivery-secondary air volume (e.g., total secondary air volume discharged from all secondary air pipes) during the initial feedstock delivery phase comprises from about 400 to about 700 m$^3$/hr, such as at least about any of the following: 400, 420, 450, 480, 500, 520, and 550 m$^3$/hr, and/or at most about any of the following: 700, 680, 650, 620, 600, 580, and 550 m$^3$/hr. Additionally or alternatively, the pyrolysis method may comprise an average initial feedstock delivery-tertiary air volume (e.g., total tertiary air volume discharged from all tertiary air pipes) during the initial feedstock delivery phase comprises from about 0 to about 300 m$^3$/hr, such as at least about any of the following: 0, 20, 50, 80, 100, 120, 150, and 180 m$^3$/hr, and/or at most about any of the following: 300, 280, 250, 220, 200, and 180 m$^3$/hr.

In accordance with certain embodiments of the invention, the pyrolysis method a primary air ratio between the average initial feedstock delivery-primary air volume and the average primary air volume during steady-state operation comprises from about 2:1 to about 5:1, such as at least about any of the following: 2:1, 2.2:1, 2.5:1, 2.8:1, 3:1, and 3.2:1, and/or at most about any of the following: 5:1, 4.8:1, 4.5:1, 4.2:1, 4:1, 3.8:1, 3.5:1, and 3.2:1. Additionally or alternatively, the pyrolysis method may comprise a secondary air ratio between the average initial feedstock delivery-secondary air volume and the average secondary air volume during steady-state operation comprises from about 0.8:1 to about 2:1, such as at least about any of the following: 0.8:1, 1:1, 1.2:1, 1.3, 1.4:1, and 1.5:1, and/or at most about any of the following: 2:1, 1.9:1, 1.8:1, 1.7:1, 1.6:1 and 1.5:1. Additionally or alternatively, the pyrolysis method may comprise a tertiary air ratio between the average initial feedstock delivery-tertiary air volume and the average tertiary air volume during steady-state operation comprises from about 0.1:1 to about 0.5:1, such as at least about any of the following: 0.1:1, 0.2:1, and 0.3:1, and/or at most about any of the following: 0.5:1, 0.4:1, and 0.3:1.

These and other modifications and variations to the invention may be practiced by those of ordinary skill in the art without departing from the spirit and scope of the invention, which is more particularly set forth in the appended claims. In addition, it should be understood that aspects of the various embodiments may be interchanged in whole or in part. Furthermore, those of ordinary skill in the art will appreciate that the foregoing description is by way of example only, and it is not intended to limit the invention as further described in such appended claims. Therefore, the spirit and scope of the appended claims should not be limited to the exemplary description of the versions contained herein.

What is claimed is:

1. A pyrolyser, comprising:
    (i) a pyrolysis chamber defining an interior compartment having an upper portion and a lower portion, wherein the pyrolysis chamber includes a feed inlet, a product outlet, an exhaust gas outlet, and an operational length comprising a linear distance from the feed inlet to the product outlet;
    (ii) a trough housed inside the pyrolysis chamber and located in the lower portion of the interior compartment and extending through the pyrolysis chamber along the operational length of the pyrolysis chamber;
    (iii) a material handling system comprising a paddle auger located within the trough and configured to convey biomass from the feed inlet towards the product outlet; wherein the paddle auger comprises an auger shaft, a plurality of sets of paddles directly or indirectly connected to the auger shaft, and a plurality of flights interconnecting the plurality of paddles, wherein the plurality of sets of paddles are located along an auger length of the paddle auger, and wherein the plurality of sets of paddles each include a plurality of individual paddles located around a circumference of the auger shaft and being located within ±10% of an equidistant distance from each other at a respective position along the auger length.

2. The pyrolyser claim 1, w wherein the plurality of individual paddles are located equidistant from each other around the circumference of the auger shaft.

3. The pyrolyser claim 1, wherein the plurality of individual paddles includes at least a portion thereof having (i) a radial arm having a first end connected to the auger shaft and a second end, and (ii) a cross arm connected to the second end of the radial arm, and wherein a paddle ratio between a cross arm-length to a radial arm-length ranges from about 0.5:1 to about 2:1.

4. The pyrolyser of claim 3, wherein the plurality of flights include a plurality of inner flights and a plurality of outer flights, wherein (i) the plurality of inner flights interconnect respective radial arms of a first set of paddles to respective second radial arms of a second set of paddles, and (ii) the plurality of outer flights interconnect respective cross arms of the first set of paddles to respective third cross arms of a third set of paddles, wherein the first set of paddles is located between and adjacent to the second set of paddles and the third set of paddles along the auger length.

5. The pyrolyser of claim 4, wherein the plurality of flights comprise the plurality of inner flights and the plurality of outer flights being provided in an alternating manner along the auger length.

6. The pyrolyser of claim 1, wherein the exhaust gas outlet is located at a top portion of the pyrolysis chamber and is operatively coupled to a chimney, and wherein the pyrolysis chamber comprises (i) a first zone including the feed inlet and comprising from about 10 to about 40% of the operational length of the pyrolysis chamber, (ii) a second zone including an imaginary center line dividing the pyrolysis chamber into a front half including the first zone and a back half, the second zone comprising from about 10 to about 40% of the operational length of the pyrolysis chamber, and a third zone including the product outlet and being located in the back half of the pyrolysis chamber, the third zone comprising from about 10 to about 40% of the operational length of the pyrolysis chamber; wherein the first zone is located adjacent a first end of the pyrolysis chamber, the third zone is located adjacent a second end of the pyrolysis chamber, and the third zone is located adjacent and in between the first zone and the third zone, and wherein a center point of the exhaust gas outlet is located within the first zone or the second zone.

7. The pyrolyser of claim 6, wherein the center point of the exhaust gas outlet is located at the center line or in the front half of the pyrolysis chamber.

8. The pyrolyser of claim 6, wherein a center point of the exhaust gas outlet is located from the product inlet by about 20% to about 50% of the operational length of the pyrolysis chamber-.

9. The pyrolyser of claim 1, wherein the trough comprises a generally U-shaped configuration, and comprises a cast ceramic material.

10. The pyrolyser of claim 9, wherein the trough comprises a length measured along the operation length of the pyrolysis chamber and an internal width perpendicular to the length, and wherein a trough-ratio of the width to the height comprises from about 0.5:1 to about 3:1.

11. A pyrolysis method, comprising:
    (i) providing a pyrolyser according to claim 1;
    (ii) feeding a biomass material into the pyrolyser via the feed inlet of the pyrolyser chamber;
    (iii) conveying the biomass material from the feed inlet towards the product outlet while heating the biomass material to an elevated temperature sufficient to convert the biomass to a biochar product prior to reaching the product outlet.

12. The method of claim 11, further comprising (i) maintaining a first temperature of a first zone from about 550 to about 750° C., (ii) maintaining a second temperature of a second zone from about 650 to about 900° C., and (iii) maintaining a third temperature of a third zone from about 800 to about 1000° C.;
    wherein the first zone includes the feed inlet and comprises from about 10 to about 40% of the operational length of the pyrolysis chamber, (ii) the second zone includes an imaginary center line dividing the pyrolysis chamber into a front half including the first zone and a back half, the second zone comprising from about 10 to about 40% of the operational length of the pyrolysis chamber, and the third zone includes the product outlet and is located in the back half of the pyrolysis chamber, the third zone comprising from about 10 to about 40% of the operational length of the pyrolysis chamber; and wherein the first zone is located adjacent a first end of the pyrolysis chamber, the third zone is located adjacent a second end of the pyrolysis chamber, and the third zone is located adjacent and in between the first zone and the third zone.

13. The method of claim 11, wherein the method comprises one or more of the following (i) a primary air ratio between an average initial feedstock delivery-primary air volume and an average primary air volume during steady-state operation comprises from about 2:1 to about 5:1; (ii) a secondary air ratio between an average initial feedstock delivery-secondary air volume and an average secondary air volume during steady-state operation comprises from about 0.8:1 to about 2:1; and (iii) a tertiary air ratio between an average initial feedstock delivery-tertiary air volume and an average tertiary air volume during steady-state operation comprises from about 0.1:1 to about 0.5:1.

14. A pyrolyser, comprising:
(i) a pyrolysis chamber defining an interior compartment having an upper portion and a lower portion, wherein the pyrolysis chamber includes a feed inlet, a product outlet, an exhaust gas outlet, and an operational length comprising a linear distance from the feed inlet to the product outlet;
(ii) a trough housed inside the pyrolysis chamber and located in the lower portion of the interior compartment and extending through the pyrolysis chamber along the operational length of the pyrolysis chamber;
(iii) a material handling system located within the trough and configured to convey biomass from the feed inlet towards the product outlet;
(iv) a plurality of primary air pipes configured to discharge primary air proximately above and across a top portion of the trough;
(v) one or more secondary air pipes configured to discharge secondary air into a rear portion of the pyrolysis chamber; and
(vi) one or more tertiary air pipes extending along the upper portion of the pyrolysis chamber from a rear portion of the pyrolysis chamber towards a front portion of the pyrolysis chamber; wherein the one or more tertiary air pipes each includes a plurality of tertiary air orifices along a length of each tertiary air pipe, wherein the one or more tertiary air pipes may each have a length from about 25 to 100% of the operational length of the pyrolysis chamber.

15. The pyrolyser of claim 14, wherein the plurality of primary air pipes comprise a first plurality of primary air pipes configured to discharge primary air over the top portion of the trough from a first side, and a second plurality of primary air pipes configured to discharge primary air over the top portion of the trough from an opposing second side; and wherein the first plurality of primary air pipes, the second plurality of primary air pipes, or both are positioned in a spaced-apart configuration along the operation length.

16. The pyrolyser of claim 15, wherein the first plurality of primary air pipes and the second plurality of primary air pipes are positioned relative to each other to define a plurality of corresponding pairs of primary air pipes that are aligned with each other across the trough, and wherein the plurality of corresponding pairs of primary air pipes include a first group of corresponding pairs of primary air pipes defining a first zone, a second group corresponding pairs of primary air pipes defining a second zone, and third group of corresponding pairs of primary air pipes defining a third zone; wherein a first volume of primary air discharged from the first zone, a second volume of primary air discharged from the second zone, and a third volume of air discharged from the third zone are independently adjustable from each other.

17. The pyrolyser of claim 16, wherein the one or more secondary air pipes terminate at a location within the third zone, and each of the one or more tertiary air pipes includes a first end proximate to the rearmost end of the pyrolysis chamber and a second end distal from the rearmost end of the pyrolysis chamber.

18. The pyrolyser of claim 14, wherein the plurality of tertiary air orifices (a) define an orifice density comprising a number of tertiary air orifices per length of the respective tertiary air pipes from about 2 to about 10 tertiary air orifices per meter of the respective tertiary air pipes; (b) have a variable diameter along a length of the respective tertiary air pipes, including a first tertiary air orifice proximate the rearmost end of the pyrolysis chamber, a second tertiary air orifice proximate a frontmost portion of the pyrolysis chamber, and a third tertiary air orifice located between the first and second tertiary air orifices, wherein the first tertiary air orifice is larger than the third tertiary air orifice, and the third tertiary air orifice is larger than the second tertiary air orifice; or (c) both (a) and (b).

19. A pyrolysis method, comprising:
(i) providing a pyrolyser according to claim 14;
(ii) feeding a biomass material into the pyrolyser via the feed inlet of the pyrolyser chamber;
(iii) conveying the biomass material from the feed inlet towards the product outlet while heating the biomass material to an elevated temperature sufficient to convert the biomass to a biochar product prior to reaching the product outlet.

20. The method of claim 19, further comprising (i) maintaining a first temperature of a first zone from about 550 to about 750° C., (ii) maintaining a second temperature of a second zone from about 650 to about 900° C., and (iii) maintaining a third temperature of a third zone from about 800 to about 1000° C.;
wherein the first zone includes the feed inlet and comprises from about 10 to about 40% of the operational length of the pyrolysis chamber, (ii) the second zone includes an imaginary center line dividing the pyrolysis chamber into a front half including the first zone and a back half, the second zone comprising from about 10 to about 40% of the operational length of the pyrolysis chamber, and the third zone includes the product outlet and is located in the back half of the pyrolysis chamber, the third zone comprising from about 10 to about 40% of the operational length of the pyrolysis chamber; and wherein the first zone is located adjacent a first end of the pyrolysis chamber, the third zone is located adjacent a second end of the pyrolysis chamber, and the third zone is located adjacent and in between the first zone and the third zone.

21. The method of claim 19, wherein the method comprises one or more of the following (i) a primary air ratio between an average initial feedstock delivery-primary air volume and an average primary air volume during steady-state operation comprises from about 2:1 to about 5:1; (ii) a secondary air ratio between an average initial feedstock delivery-secondary air volume and an average secondary air volume during steady-state operation comprises from about 0.8:1 to about 2:1; and (iii) a tertiary air ratio between an average initial feedstock delivery-tertiary air volume and an average tertiary air volume during steady-state operation comprises from about 0.1:1 to about 0.5:1.

22. A pyrolyser, comprising:
(i) a pyrolysis chamber defining an interior compartment having an upper portion and a lower portion, wherein the pyrolysis chamber includes a feed inlet, a product outlet, an exhaust gas outlet, and an operational length comprising a linear distance from the feed inlet to the product outlet;

(ii) a trough housed inside the pyrolysis chamber and located in the lower portion of the interior compartment and extending through the pyrolysis chamber along the operational length of the pyrolysis chamber;

(iii) a material handling system comprising a paddle auger located within the trough and configured to convey biomass from the feed inlet towards the product outlet; wherein the paddle auger comprises an auger shaft, a plurality of sets of paddles directly or indirectly connected to the auger shaft, and a plurality of flights interconnecting the plurality of paddles, wherein the paddle auger has a paddle density comprising a number of the plurality of sets of paddles per auger length from 2 to 15 sets of paddles per meter of auger length;

(iv) a primary air source including a plurality of primary air pipes configured to discharge primary air proximately above and across a top portion of the trough;

(v) a secondary air source including one or more secondary air pipes configured to discharge secondary air into a rear portion of the pyrolysis chamber; and (vi) a tertiary air source including one or more tertiary air pipes extending along the upper portion of the pyrolysis chamber from a rear portion of the pyrolysis chamber towards a front portion of the pyrolysis chamber; wherein the one or more tertiary air pipes each includes a plurality of tertiary air orifices along a length of each tertiary air pipe.

* * * * *

UNITED STATES PATENT AND TRADEMARK OFFICE
CERTIFICATE OF CORRECTION

Page 1 of 1

PATENT NO. : 12,258,519 B2
APPLICATION NO. : 18/605921
DATED : March 25, 2025
INVENTOR(S) : Sheila Macdonald Kyger et al.

It is certified that error appears in the above-identified patent and that said Letters Patent is hereby corrected as shown below:

In the Claims

In Column 17, Claim 2, Line 44, "pyrolyser claim 1," should read as -- pyrolyser of claim 1, --

In Column 17, Claim 2, Line 44, "w wherein the" should read as -- wherein the --

In Column 17, Claim 3, Line 47, "pyrolyser claim 1," should read as -- pyrolyser of claim 1, --

In Column 18, Claim 8, Line 28, "chamber-." should read as -- chamber. --

Signed and Sealed this
Seventeenth Day of June, 2025

Coke Morgan Stewart
*Acting Director of the United States Patent and Trademark Office*